US010970857B2

(12) United States Patent
Gong et al.

(10) Patent No.: US 10,970,857 B2
(45) Date of Patent: Apr. 6, 2021

(54) MOVING OBJECT DETECTION METHOD AND SYSTEM BASED ON MULTIPLE SENSORS ON SAME PLATFORM

(71) Applicants: CAPITAL NORMAL UNIVERSITY, Beijing (CN); CHINAMAP HI-TECH (BEIJING) INFORMATION TECHNOLOGY CO., LTD., Beijing (CN)

(72) Inventors: Huili Gong, Beijing (CN); Xiaojuan Li, Beijing (CN); Guanjia Meng, Beijing (CN); Ruofei Zhong, Beijing (CN); Jiao Guo, Beijing (CN); Cankun Yang, Beijing (CN)

(73) Assignees: CAPITAL NORMAL UNIVERSITY, Beijing (CN); CHINAMAP HI-TECH (BEIJING) INFORMATION TECHNOLOGY CO., LTD., Beijing (CN)

(*) Notice: Subject to any disclaimer, the term of this patent is extended or adjusted under 35 U.S.C. 154(b) by 91 days.

(21) Appl. No.: 16/330,762

(22) PCT Filed: Dec. 13, 2016

(86) PCT No.: PCT/CN2016/109665
§ 371 (c)(1),
(2) Date: Mar. 5, 2019

(87) PCT Pub. No.: WO2018/049740
PCT Pub. Date: Mar. 22, 2018

(65) Prior Publication Data
US 2020/0184657 A1 Jun. 11, 2020

(30) Foreign Application Priority Data
Sep. 13, 2016 (CN) .......................... 201610822119.6

(51) Int. Cl.
*G06K 9/00* (2006.01)
*G06T 7/292* (2017.01)
(Continued)

(52) U.S. Cl.
CPC .............. *G06T 7/292* (2017.01); *G01C 11/02* (2013.01); *G01C 11/06* (2013.01); *G01P 3/68* (2013.01); *G06T 7/248* (2017.01)

(58) Field of Classification Search
None
See application file for complete search history.

(56) References Cited

U.S. PATENT DOCUMENTS 5,004,335 A * 4/1991 Montes ................ G03B 21/606
352/58
5,586,063 A * 12/1996 Hardin ..................... G01C 3/10
324/160
(Continued)

FOREIGN PATENT DOCUMENTS

CN 101216319 A 7/2008
CN 102663385 A 9/2012
(Continued)

OTHER PUBLICATIONS

International Search Report in Application No. PCT/CN2016/109665 dated Jul. 7, 2017.
(Continued)

*Primary Examiner* — Hadi Akhavannik
(74) *Attorney, Agent, or Firm* — Maschoff Brennan (57) ABSTRACT

A detection method and system are used for a moving target based on multiple sensors on the same platform. N mutually independent image sensors arranged on a monolithic planar array sensor compose an image sensor group, which has a layout where n image sensors are arranged equidistantly on the same line in a travelling direction of a satellite. The (Continued)

method includes respectively collecting image data by the multiple sensors, performing on-board pre-processing to the image data collected by each image sensor, acquiring an image from the received pre-processed image data, and performing operation to the image from different image sensors, to recognize the moving target. The system includes sequentially connected sensor groups, an image data pre-processing device and a wireless transmitting device, a wireless receiving device wirelessly connected with the wireless transmitting device, and a moving target recognition device connected with the wireless receiving device.

7 Claims, 5 Drawing Sheets

(51) Int. Cl.
    *G06T 7/246*     (2017.01)
    *G01C 11/02*     (2006.01)
    *G01C 11/06*     (2006.01)
    *G01P 3/68*     (2006.01)

(56) References Cited

U.S. PATENT DOCUMENTS

| | | | |
|---|---|---|---|
| 6,542,824 B1 | 4/2003 | Berstis | |
| 8,108,147 B1 * | 1/2012 | Blackburn | G08G 1/166 |
| | | | 701/301 |
| 8,917,905 B1 * | 12/2014 | Dill | G06K 9/00362 |
| | | | 382/103 |
| 2008/0136900 A1 * | 6/2008 | Grasnick | H04N 13/305 |
| | | | 348/51 |
| 2012/0081545 A1 * | 4/2012 | Jin | G01B 11/022 |
| | | | 348/141 |
| 2013/0050182 A1 * | 2/2013 | Glynn | H04N 13/341 |
| | | | 345/419 |
| 2013/0050450 A1 * | 2/2013 | Glynn | H04N 13/128 |
| | | | 348/55 |
| 2014/0350886 A1 | 11/2014 | Metzler | |
| 2015/0103159 A1 * | 4/2015 | Shashua | G06K 9/00791 |
| | | | 348/118 |

FOREIGN PATENT DOCUMENTS

| | | |
|---|---|---|
| CN | 103782132 A | 5/2014 |
| CN | 103782132 A | 6/2014 |
| CN | 104750480 A | 7/2015 |
| CN | 105894700 A | 8/2016 |

OTHER PUBLICATIONS

Written Opinion in Application No. PCT/CN2016/109665 dated May 31, 2017.
Office Action in Application No. 201610822119.6 dated Jun. 27, 2018.
Office Action in Application No. 201610822119.6 dated Mar. 11, 2018.

* cited by examiner

| Serial number | Sensor | | | | | | | | Outputs |
|---|---|---|---|---|---|---|---|---|---|
| 1 | | | | | | | | | |
| 2 | | | | | | | | | →$\|L_2-L_1\|$ |
| 3 | | | | | | | | | →$\|L_3-L_2\|$ |
| | ****** | | | | | | | | |
| n-2 | | | | | | | | | →$\|L_{n-3}-L_{n-2}\|$ |
| n-1 | | | | | | | | | →$\|L_{n-2}-L_{n-1}\|$ |
| n | | | | | | | | | →$\|L_n-L_{n-1}\|$ |

FIG. 3A

| Serial number | Sensor | | | | | | | | Outputs |
|---|---|---|---|---|---|---|---|---|---|
| 1 | | | | | | | | | |
| 2 | | | | | | | | | →$\|L_{1+m}-L_1\|$ |
| 3 | | | | | | | | | →$\|L_{2+m}-L_2\|$ |
| | ****** | | | | | | | | |
| n-2 | | | | | | | | | →$\|L_{n-2}-L_{n-m-2}\|$ |
| n-1 | | | | | | | | | →$\|L_{n-1}-L_{n-m-1}\|$ |
| n | | | | | | | | | →$\|L_n-L_{n-m}\|$ |

FIG. 3B

| Serial number | Sensor | | | | | | | | Outputs |
|---|---|---|---|---|---|---|---|---|---|
| 1 | | | | | | | | | |
| 2 | | | | | | | | | |
| 3 | | | | | | | | | |
| | ⋯⋯ | | | | | | | | |
| m*2 | | | | | | | | | →SUM(1,m)-SUM(m+1,m*2) |
| | ⋯⋯ | | | | | | | | ⋯⋯ |
| n | | | | | | | | | →SUM(n-m,m)-SUM(n-m*2,n-m+1) |

MOVING OBJECT DETECTION METHOD AND SYSTEM BASED ON MULTIPLE SENSORS ON SAME PLATFORM

TECHNICAL FIELD

The present invention relates to the application field of space-to-earth observation, in particular to a detection method and system for a moving target.

BACKGROUND

Detection of a moving target is an important cutting-edge technology in the field of remote sensing and image processing. With the development of satellite remote sensing technology, long strides have been made in detecting objects moving at high speed by use of satellite remote sensing technology, which is playing an increasingly important role in various sectors of national economic construction.

In emergency response, such as disaster reduction and disaster relief, the detection technology of a moving target is also given a full play. The moving object detection, for instance, can quickly find humans moving among ruins, wining precious prime-time for disaster rescue and relief. The technology is able to judge movement and distribution of group targets, shedding light on the movement of the affected people instantly when the road is impassable. With the technology, it is possible to monitor vehicles on the road and calculate the speed thereof, thereby effectively judging congestion on the road in storm or blizzard disasters. Further, the detection can realize quick detection of a ship target in the vast sea, providing vital support for maritime search and rescue, besides which the technology can also assess and issue an alarm against any moves of pirates, providing information guarantee for overseas convoys.

The detection of the velocity of a moving target mainly depends on SAR/GMTI images, however, the technology, experience as well as technical accumulation are relatively falling short due to complexity and challenges in realizing the technology, as a result of which, no satellites carrying a SAR/GMTI sensor have yet been launched. On one hand, the detection of a moving target using multiple sensor images on the same platform echoes the urgent need, making it possible to meet the pressing demand for the detection technology of moving targets during emergency responses such as disaster reduction and relief, on the other hand, the technology is highly practical, because it employs a method with high operation efficiency and convenient to be implemented on-board in the next step, ensuring the performance and precision of moving target detection.

When detecting a moving target using multiple sensor images on the same platform, great detection errors are required to be solved technically due to the moving target moving over a distance of sub-pixel levels in an image, resulting from short inter-channel imaging time intervals of the sensor.

CCD sensors (Charged Coupled Devices) are a charge-coupled device, which, being made of a highly photosensitive semiconducting material, is able to store signal charges generated by light, and by applying a specifically timed pulse to the sensor, the stored signal charges are enabled to transmit directionally within the CCD to achieve self-scanning. Traditional CCD sensors include a linear array type, a planar array type and a TDI type, which are formed by many micro-semiconductor silicon photosensitive solid elements arranged in lines or planes with extremely high density. The linear array ones transform optical images formed thereon into timing electrical signals and output the signals, and must conduct shave scan motion relative to an imaging region when acquiring two-dimensional image signals; the planar array CCD is a two-dimensional image sensor, which can directly convert a two-dimensional image into video signals and output the signals, and is suitable for staring imaging for the imaging region; the TDI-CCD has a structure similar to that of the planar array ones, performs imaging via shave scanning, and sequentially exposes the same target on the ground gradually to perform charge accumulation, solving the problem of energy insufficiency for an image via time delay integration.

With the scenes to be imaged by a linear array-type image sensor keeps moving during exposure, the velocity of movement imposes a substantial limit on exposure time of the pixels of a linear array-type image sensor. In particular, in the case of low illumination or fast scanning, signals sensed by the image sensor are weak, and the system experienced a reduction in its signal-noise ratio (Signal to Noise Rate, SNR), affecting the quality of the images being taken. To address the problem, the TDI technology is widely applied in the linear array-type image sensor. The TDI type image sensor is able to expose the same target repeatedly among moving objects, prior to accumulating the multiple exposure results. Such method delivers an equivalent effect of prolonging the integration time of optical signals, namely, prolonging the exposure time of a single pixel, thus obtaining a better signal-noise ratio and sensitivity.

The CMOS image sensor is a complementary metal oxide semiconductor, an image sensor integrating circuits of photosensitive elements, amplifiers, A/D converters, memory, digital signal processors and computer interfaces on a silicon chip. In recent years, the rapid development of CMOS process leads to the emergence of the TDI type CMOS image sensor, which provides a more effective scheme for the TDI technology to make a breakthrough.

SUMMARY

The technical problem to be solved by the present invention is to present a detection method and system for a moving target based on multiple mutually independent sensors arranged on a monolithic planar array sensor.

To solve the above-mentioned technical problem, the present invention adopts the following technical solutions:

a detection method for a moving target based on multiple sensors on the same platform, n mutually independent image sensors arranged on a monolithic planar array sensor compose an image sensor group, the image sensor group has a layout, where n image sensors are arranged equidistantly on the same line in a traveling direction of a satellite; wherein n is an integer greater than 1, the method includes: collecting image data by each image sensor of the image sensor group; performing on-board pre-processing to the image data collected by each image sensor, and outputting pre-processed image data; and acquiring an image from the received pre-processed image data, and performing operation to the image from different image sensors, so as to recognize the moving target.

Further, the method further includes a step of: computing velocity of movement of the moving target.

Further, computing velocity of movement of the moving target includes: in the case of two image sensors, difference in imaging time between a first image sensor and a second image sensor is t, a moving distance is s, then velocity of the moving target is v=s/t.

Further, computing velocity of movement of the moving target includes: in the case of more than three image sensors, the velocity of the moving target is obtained by: computing the velocity of movement of the moving target from data collected by every two adjacent image sensors among the multiple image sensors, and averaging all computed velocities of movement.

Further, on-board pre-processing includes conducting signal subtraction to different rows of each image sensitive unit row of the image sensors.

Further, signal subtraction on different rows is carried out in any one of the following manners: conducting signal progressive subtraction to each row of image sensitive units, and outputting progressive subtraction result; conducting signal interlaced subtraction to each row of image sensitive units, and outputting interlaced subtraction result; and adding m adjacent rows of signals and taking an average thereof, with every m rows of image sensitive units viewed as a region, conducting region-by-region subtraction, and outputting region-by-region subtraction result.

Further, the recognizing the moving target further includes: conducting subtraction to multiple images acquired by the multiple image sensors, wherein the region with a gradient greater than a threshold is the very region where the moving target is located, solving lines between any two points on the subtracted image via Hough transformation, and recognizing points on the same line as the same target or a succession of targets moving in the same direction.

A detection system for a moving target based on multiple sensors on the same platform, n mutually independent image sensors arranged on a monolithic planar array sensor compose an image sensor group; the image sensor group has a layout where n image sensors are arranged equidistantly on the same line in a travelling direction of a satellite, wherein n is an integer greater than 1, and the system also includes an image data pre-processing device and a wireless transmitting device sequentially connected with the image sensor group, a wireless receiving device wirelessly connected with the wireless transmitting device, and a moving target recognition device sequentially connected with the wireless receiving device, wherein, each image sensor in the image sensor group is respectively configured to collect image data, the image data pre-processing device is configured to pre-process the image data collected by each image sensor, the wireless transmitting device is configured to transmit the pre-processed image data, the wireless receiving device is configured to receive signals from the wireless transmitting device, and the moving target recognition device is configured to acquire images according to the pre-processed data received by the wireless receiving device, and conduct operation to the images from different image sensors, so as to recognize the moving target.

Further, a velocity of movement operation device, connected with the moving target recognition device, is further included; the velocity of movement operation device is configured to compute velocity of movement of a recognized moving target.

Further, the image data pre-processing device is further configured to conduct signal subtraction to different rows of each image sensitive unit row on the image sensors.

In comparison with the prior art, the present invention technical solution are advantaged in that:

Adopting a clock oscillation circuit for a monolithic planar array sensor as a whole enables multiple sensors on the same platform to be accurately synchronized or to have precise time difference. Image sensors arranged on one monolithic planar array sensor are located on one imaging plane and arranged in a line along the direction of image sensitive unit columns on the monolithic planar array sensor, improving the accuracy of the moving target detection. The method of the present invention has high operation efficiency, and small outputting data volume, is easy to be realized on-board in a next stop, thus ensuring performance and accuracy of the moving target detection. The method in the present invention can satisfy urgent demands for the moving target detection technology by emergency responses, such as disaster reduction and relief.

BRIEF DESCRIPTION OF THE DRAWINGS

All sorts of other advantages and benefits would be clear to one with ordinary skill in the art by reading detailed description of the preferred implementation beneath. The drawings are just intended to illustrate the purpose of the preferred implementations, and not to be deemed as limits on the present invention. Throughout the drawings, the same referential numeral designations represent like elements. In the drawings.

DETAILED DESCRIPTION

Exemplary embodiments of the present disclosure will be described in more detail in conjunction with the drawings below. Although the exemplary embodiments of the present disclosure are shown in the drawings, it should be understood that, the present disclosure may be implemented in all kinds of ways rather than being limited by the embodiment stated herein. In contrast, these embodiments are provided for a thorough understanding of the present disclosure, and to convey the scope of the present disclosure to those skilled in the art integrally.

Figure 1A:
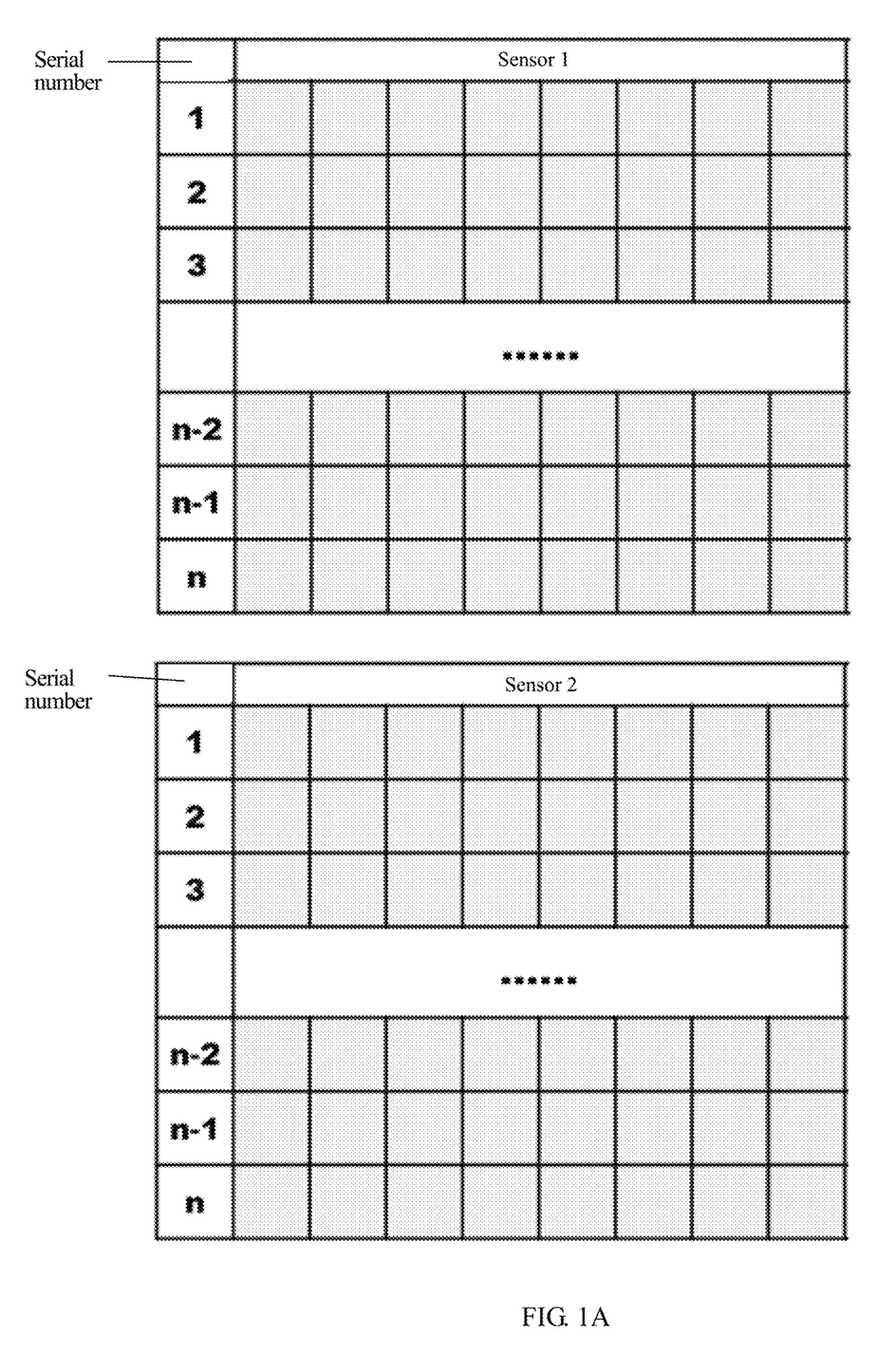
FIG. 1A is a layout diagram for two sensors on the same platform in an embodiment of the present invention.
Figure 1B:
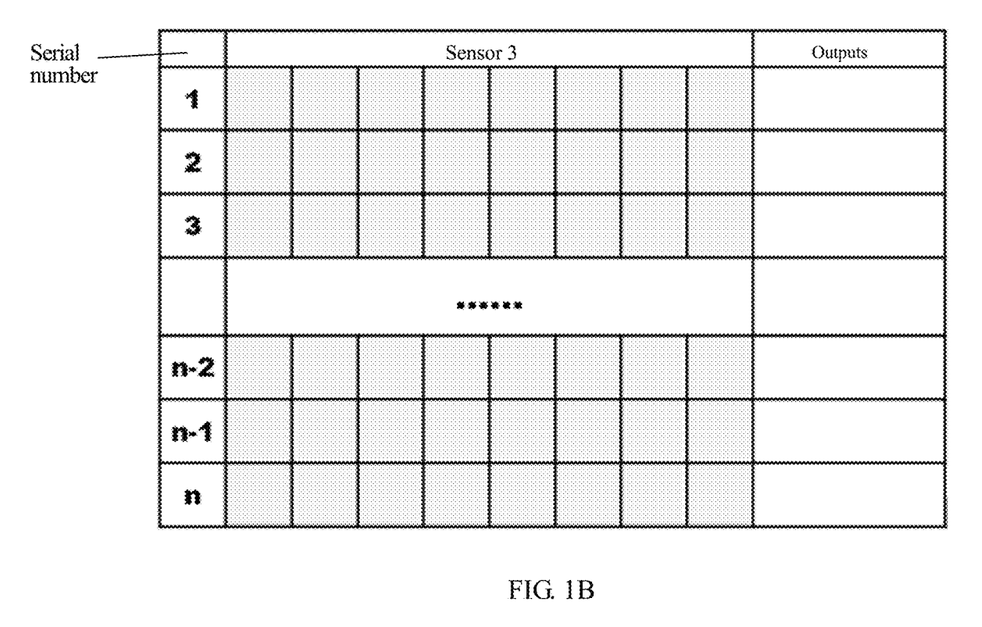
FIG. 1B is a layout diagram for three sensors on the same platform in an embodiment of the present invention.

The present invention is based on mutually independent multiple image sensors arranged on a monolithic planar array sensor, which is referred to in this text as multiple sensors on the same platform. A row of image sensitive unit or multiple rows of image sensitive units on a monolithic planar array sensor compose an independent image sensitive unit array, which acts as an independent image sensor. Independents image sensors arranged on a monolithic planar array sensor share the same clock oscillation circuit, multiple sensors on the same platform are able to be synchronized precisely or to have precise time difference. In addition, image sensors arranged on one monolithic planar array sensor are located in a line along the direction of image sensitive unit columns on a monolithic planar array sensor on an imaging plane, thereby avoiding the problem of arranging dispersed multiple image sensors on the same imaging plane and the tendency of position deviation for the image sensors when being arranged on a line. For the sake of realizing detection of a moving target, multiple mutually independent image sensors located on a monolithic planar array sensor are adopted to respectively acquire multiple image, those multiple image sensors compose an image sensor group 1. The image sensor group 1 has a layout, where n image sensors are arranged equidistantly on the same line in a travelling direction of a satellite; wherein n is an integer greater than 1. In embodiment 1 n=2, two image sensors are arranged in the travelling direction of the satellite, and the two image sensors are on the same line, such as a first image sensor 11 and a second image sensor 12 shown in FIG. 1A. In embodiment 2 n=3, three image sensors are arranged in the travelling direction of the satellite, and the three image sensor are arranged equidistantly and are on the same line, such as a first image sensor 11, a second image sensor 12 and a third image sensor 13 as shown in FIG. 1B. Multiple image sensors located on one monolithic planar array sensor can each be a linear array sensor, alternatively, each be a planar array sensor, or be either a linear array sensor or a planar array sensor.

Figure 2:
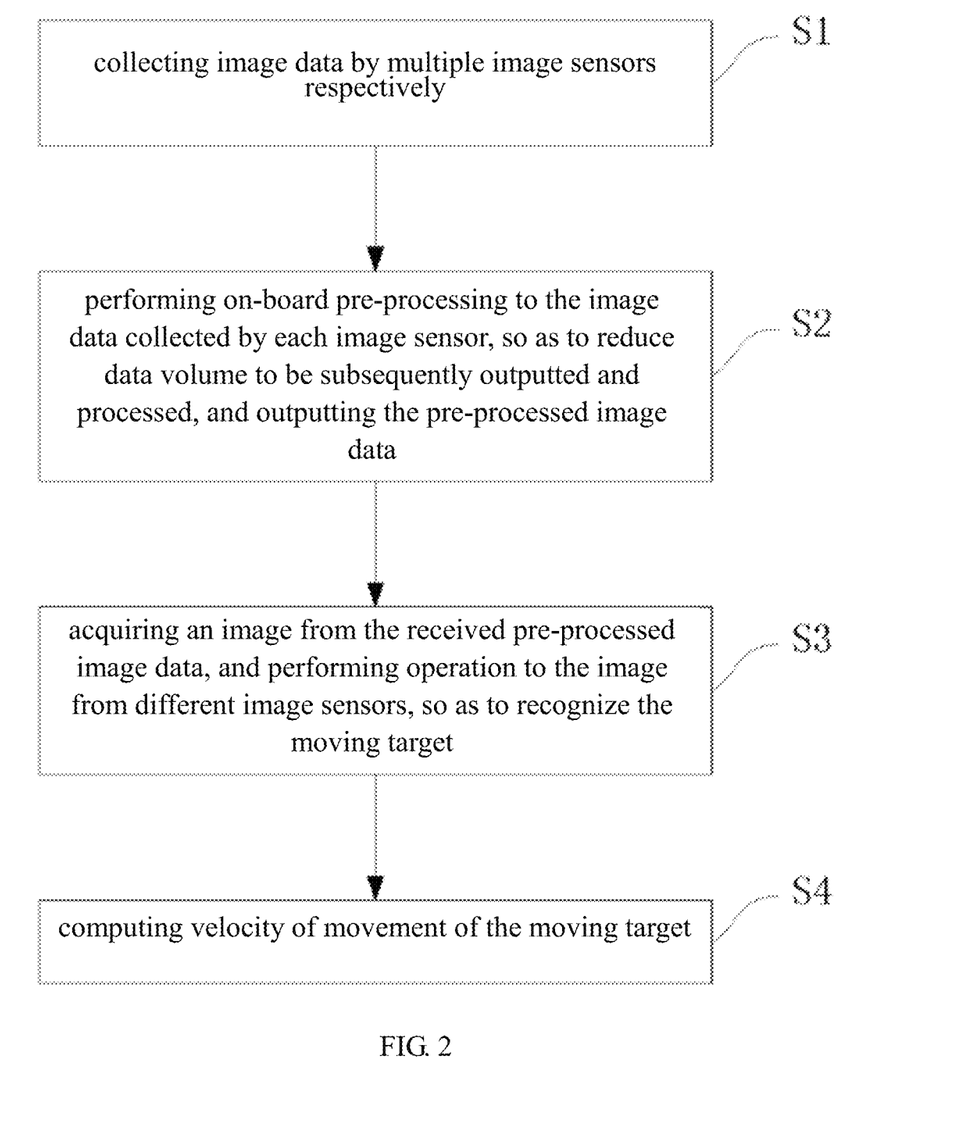
FIG. 2 is a flowchart for a detection method for a moving target based on multiple sensors on the same platform in an embodiment of the present invention.

As shown in FIG. 2, a detection method for a moving target based on multiple sensors on the same platform described in an embodiment of the present invention includes the following steps:

Steps S1, respectively collecting image data by each image sensor of the image sensor group 1.

Steps S2, performing on-board pre-processing to the image data collected by each image sensor, wherein the pre-processing includes conducting signal subtraction to different rows of each image sensitive unit row of the image sensors, so as to reduce data volume to be subsequently outputted and processed, and outputting the pre-processed image data.

Figure 3A:
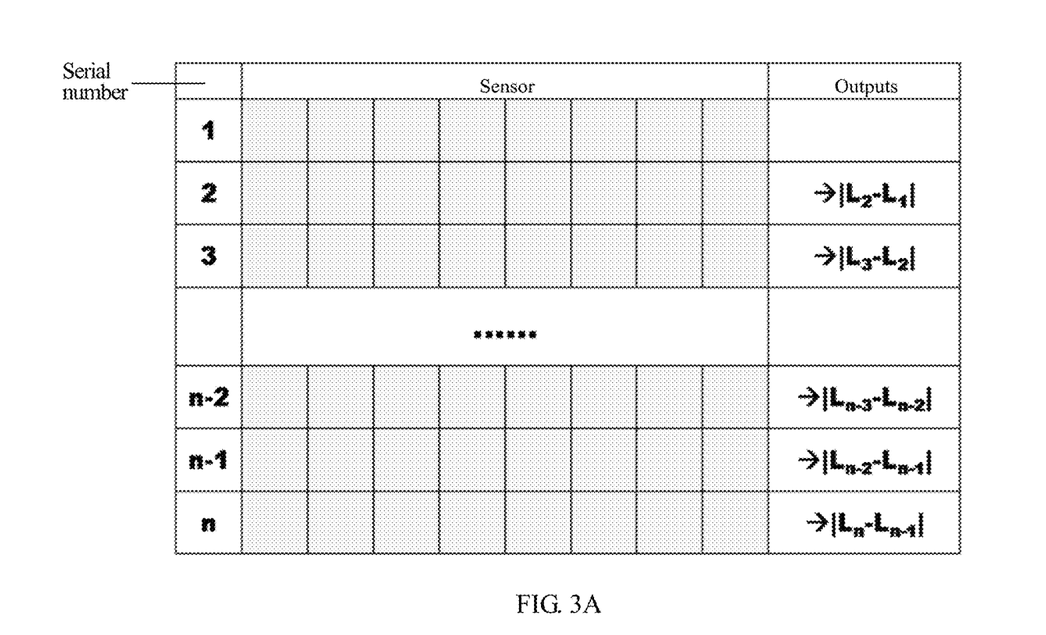
FIG. 3A demonstrates a way for signal subtraction to different rows in on-board data pre-processing of the present invention.

Signal subtraction on different rows of each image sensitive unit row of the image sensors is carried out in any one of the following manners:

As shown in FIG. 3A, conducting signal progressive subtraction to each row of image sensitive units, and outputting progressive subtraction result. The data volume acquired by the multiple sensors is so large that the satellite is under an enormous pressure to transmit data, even to the point of being overwhelmed. A suspicious moving target region can be obtained by direct on-board subtraction merely, and transmitting the region back can do the work without transmitting the whole image.

Figure 3B:
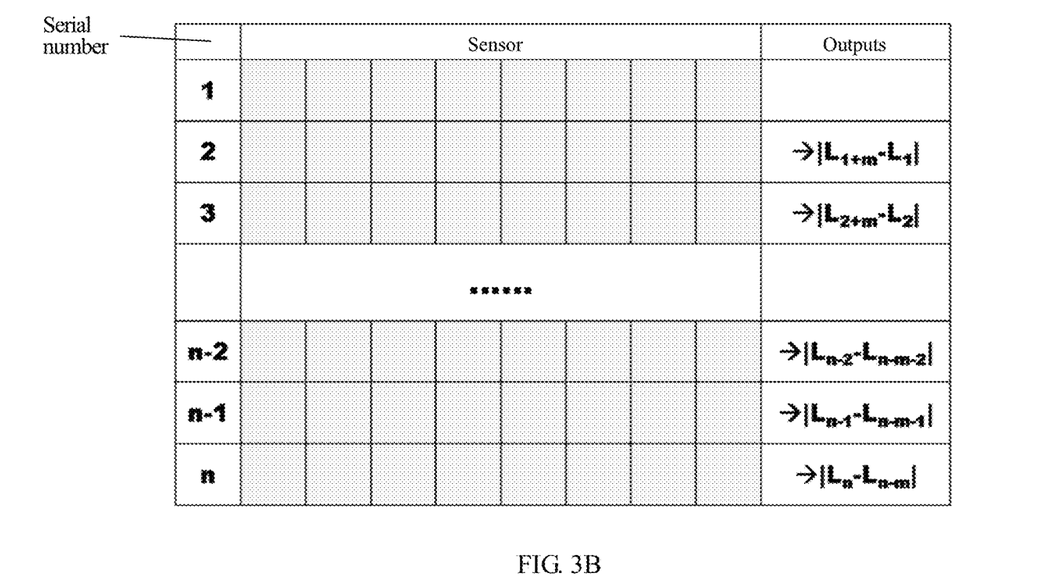
FIG. 3B demonstrates another way for signal subtraction to different rows in on-board data pre-processing of the present invention.

As shown in FIG. 3B, conducting signal interlaced subtraction to each row of image sensitive units 1, and outputting interlaced subtraction result. For a target moving at a high speed, due to the high velocity of movement, the signals on two adjacent rows of image sensitive units differ so little that a suspicious moving target region is difficult to be detected, as a consequence, the progressive subtraction is adopted to obtain the moving target region. Compared with progressive subtraction, the interlaced subtraction reduces computational complexity much more and is suitable for high-speed moving target detection. The subtraction may be conducted to two rows with one row in between, as an alternative, the subtraction may also be conducted to two rows with two rows in between, and surely there may be more rows between the two rows undergoing subtraction, the number of the rows in between is determined according to the total number of image sensitive unit rows on a sensor and the velocity of movement of the moving target.

Figure 3C:
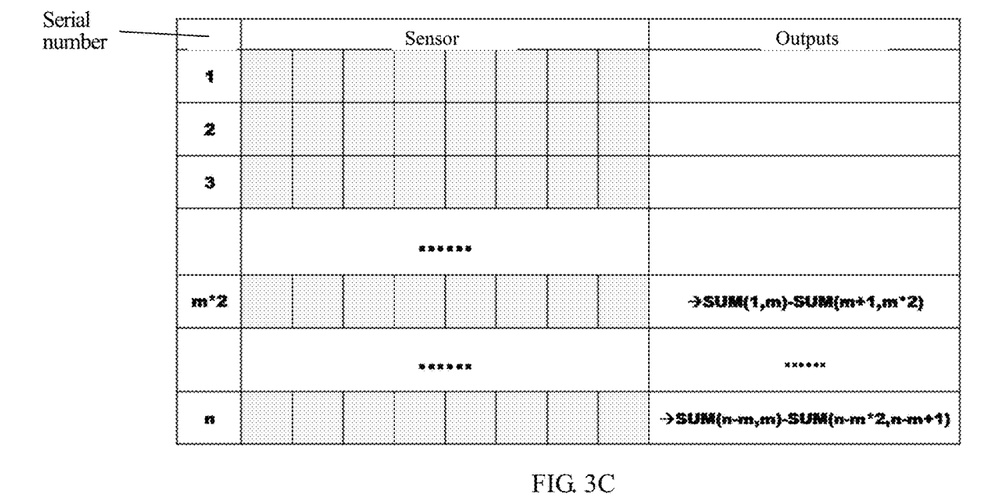
FIG. 3C demonstrates a third way for signal subtraction to different rows in on-board data pre-processing of the present invention.

As shown in FIG. 3C, m adjacent rows of signals are added and an average thereof is taken, with every m rows of image sensitive units viewed as a region, region-by-region subtraction is conducted, and region-by-region subtraction result is outputted. Simple subtraction has a problem of low signal-noise ratio, which affects the detection rate, the subtraction can be conducted after accumulation, improving detection rate, and reducing false alarm rate.

Steps S3, acquiring an image from the received pre-processed image data, and performing operation to the image from different image sensors, so as to recognize the moving target.

Conducting subtraction to multiple images acquired by the multiple image sensors, wherein the region with a gradient greater than a threshold is the very region where the moving target is located, the threshold is preferred to be 0.2. Because the grey scale of a non-moving target region after subtraction is close to 0, the grey scale of a moving target region after subtraction has a great value and a great grey scale gradient. After image subtraction, an image with only the point of a moving target is obtained. Solving lines between any two points on the image via Hough transformation, and recognizing points on the same line as the same target or a succession of targets moving in the same direction.

Steps S4, computing velocity of movement of the moving target.

In the case of using two image sensors to collect the image of a moving target, assuming the difference in imaging time between a first image sensor 11 and a second image sensor 12 is t, a moving distance is s, then velocity of the moving target is v=s/t. In the case of using three image sensors to collect the image of a moving target, assuming the difference in imaging time between a first image sensor 11 and a second image sensor 12 is t1, a moving distance is s1; and assuming the difference in imaging time between the second image sensor 12 and a third image sensor 13 is t2, the moving distance is s2, then the velocity of the moving target is v=(v1+v2)/2=(s1/t1+s2/t2)/2. As a result, in the case of more than three image sensors to collect the image of the moving target, the velocity of the moving target is obtained by: computing velocity of movement of the moving target includes: the velocity of the moving target is obtained by: computing the velocity of movement of the moving target from data collected by every two adjacent image sensors among the multiple image sensors, and averaging all computed velocities of movement.

Figure 4:
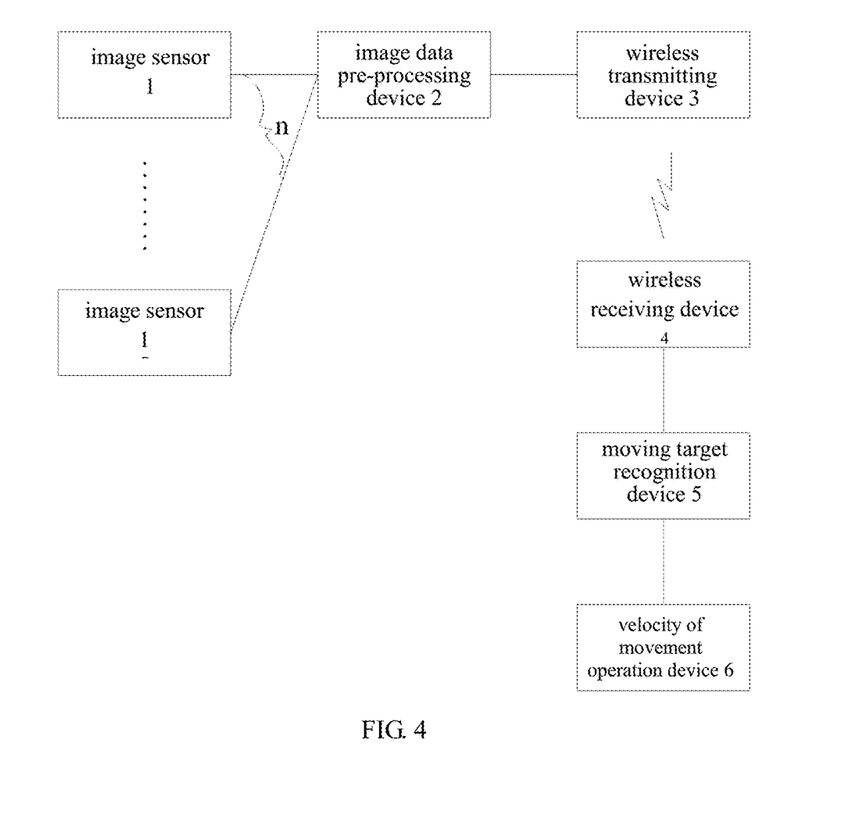
FIG. 4 is a structural diagram for a detection system for a moving target based on multiple sensors on the same platform in an embodiment of the present invention.

The detection system for a moving target described by an embodiment of the present invention includes mutually independent multiple image sensors arranged on a monolithic planar array sensor, which is referred to in this text as multiple sensors on the same platform, these multiple image sensors compose an image sensor group 1. The image sensor has a layout, where n sensors are arranged equidistantly on the same line in a travelling direction of a satellite; wherein n is an integer greater than 1. In embodiment 1 n=2, two image sensors are arranged in the travelling direction of the satellite, and the two image sensors are on the same line, such as a first image sensor 11 and a second image sensor 12 shown in FIG. 1A. In embodiment 2 n=3, three image sensors are arranged in the travelling direction of the satellite, and the three image sensor are distributed equidistantly and are on the same line, such as a first image sensor 11, a second image sensor 12 and a third image sensor 13 as shown in FIG. 1B. As shown in FIG. 4, the system further includes an image data pre-processing device 2 connected with an image sensor group 1 (including a first image sensor 11, . . . , an $n^{th}$ image sensor 1n), a wireless transmitting device 3 connected with the image data pre-processing device 2, a wireless receiving device 4 wirelessly connected with the wireless transmitting device 3, and a moving target recognition device 5 sequentially connected with the wireless receiving device 4, and a velocity of movement operation device 6 connected with the moving target recognition device 5.

Wherein, each image sensor in the image sensor group 1 is respectively used for collecting image data. The image sensor may be a linear array-type CCD sensor, a planar array-type CCD sensor or a TDI-type CCD sensor arranged on a monolithic planar array sensor, or the image sensor may be a linear array-type CMOS sensor, a planar array-type CMOS sensor or a TDI-type CMOS sensor arranged on a monolithic planar array sensor.

The image data pre-processing device 2 is used for pre-processing image data collected by each image sensor, for a TDI-type image sensor, signal subtraction is conducted to different rows of each image sensitive unit row of the image sensors, and the subtraction is specifically carried out in any one of the following manners.

As shown in FIG. 3A, conducting signal progressive subtraction to each row of image sensitive units, and outputting progressive subtraction result. The data volume acquired by the multiple sensors is so large that the satellite is under an enormous pressure to transmit data, even to the point of being overwhelmed. A suspicious moving target region can be obtained by direct on-board subtraction merely, and transmitting the region back can do the work without transmitting the whole image.

As shown in FIG. 3B, conducting signal interlaced subtraction to each row of image sensitive units, and outputting interlaced subtraction result. For a target moving at a high speed, due to the high velocity of movement, the signals on two adjacent rows of image sensitive units differ so little that a suspicious moving target region is difficult to be detected, as a consequence, subtraction every few rows is adopted to obtain the moving target region. Compared with progressive subtraction, the interlaced subtraction reduces computational complexity much more and is suitable for high-speed moving target detection. The subtraction may be conducted to two rows with one row in between, as an alternative, the subtraction may also be conducted to two rows with two rows in between, and surely there may be more rows between the two rows undergoing subtraction, the number of the rows in between is determined according to the total number of image sensitive unit rows on a sensor and the velocity of movement of the moving target.

As shown in FIG. 3C, m adjacent rows of signals are added and an average thereof is taken, with every m rows of image sensitive units viewed as a region, conducting region-by-region subtraction, and outputting region-by-region subtraction result. Simple subtraction has a problem of low signal-noise ratio, which affects the detection rate, the subtraction can be conducted after accumulation, improving detection rate, and reducing false alarm rate.

The wireless transmitting device 3 is used for transmitting pre-processed image data.

The wireless receiving device 4 is used for receiving signals from the wireless transmitting device.

The moving target recognition device 5 is used for acquiring images according to the pre-processed data received by the wireless receiving device 4, and conducting operation to the images from different image sensors, so as to recognize the moving target.

The velocity of movement operation device 6 is used for computing velocity of movement of a recognized moving target.

Although the embodiments of the present invention have been illustrated and described, for one with ordinary skill in the art, various changes, modifications, replacement, variations and combinations can be made to these embodiments without departing from the principle and spirit of the present invention. The scope of the present invention is defined by appended claims and equivalents thereof.

The invention claimed is:

1. A detection method for a moving target based on multiple sensors on the same platform, wherein n mutually independent image sensors arranged on a monolithic planar array sensor compose an image sensor group and the image sensor group has a layout, where n image sensors are arranged equidistantly on the same line in a traveling direction of a satellite, wherein n is an integer greater than 1, the method comprising:
   collecting image data by each image sensor of the image sensor group;
   performing on-board pre-processing to the image data collected by each image sensor, and outputting pre-processed image data; and
   acquiring an image from the received pre-processed image data, and performing operation to the image from different image sensors, so as to recognize the moving target;
   wherein the on-board pre-processing comprises conducting signal subtraction to different rows of each image sensitive unit row of the image sensors; and
   wherein signal subtraction on different rows is carried out according to any of:
   conducting signal progressive subtraction to each row of image sensitive units, and outputting progressive subtraction result;
   conducting signal interlaced subtraction to each row of image sensitive units, and outputting interlaced subtraction result; and
   adding m adjacent rows of signals and taking an average thereof, with every m rows of image sensitive units viewed as a region, conducting subtraction region-by-region, and outputting subtraction result region-by-region.

2. The detection method for a moving target based on multiple sensors on the same platform in accordance with claim 1, further comprising:
   computing velocity of movement of the moving target.

3. The detection method for a moving target based on multiple sensors on the same platform in accordance with claim 2, wherein computing velocity of movement of the moving target comprises:
   in the case of two image sensors, difference in imaging time between a first image sensor and a second image sensor is t, a moving distance is s, then velocity of the moving target is $v=s/t$.

4. The detection method for a moving target based on multiple sensors on the same platform in accordance with claim 2, wherein computing velocity of movement of the moving target comprises:
   in the case of more than three image sensors, the velocity of the moving target is obtained by:
   computing the velocity of movement of the moving target from data collected by every two adjacent image sensors among the multiple image sensors, and averaging all computed velocities of movement.

5. The detection method for a moving target based on multiple sensors on the same platform in accordance with claim 1, wherein recognizing the moving target further comprises:
conducting subtraction to multiple images acquired by the multiple image sensors, wherein the region with a gradient greater than a threshold is the very region where the moving target is located, solving lines between any two points on the subtracted image via Hough transformation, and recognizing points on the same line as the same target or a succession of targets moving in the same direction.

6. A detection system for a moving target based on multiple sensors on the same platform, comprising:
an mutually independent image sensors arranged on a monolithic planar array sensor forming an image sensor group, the image sensor group having a layout where n image sensors are arranged equidistantly on the same line in a travelling direction of a satellite, wherein n is an integer greater than 1;
an image data pre-processing device and a wireless transmitting device sequentially connected with the image sensor group;
a wireless receiving device wirelessly connected with the wireless transmitting device; and
a moving target recognition device sequentially connected with the wireless receiving device, wherein:
each image sensor in the image sensor group is respectively configured to collect image data,
the image data pre-processing device is configured to pre-process the image data collected by each image sensor,
the wireless transmitting device is configured to transmit the pre-processed image data,
the wireless receiving device is configured to receive signals from the wireless transmitting device, and
the moving target recognition device is configured to acquire images according to the pre-processed data received by the wireless receiving device), and conduct operation to the images from different image sensors, so as to recognize the moving target;
the image data pre-processing device is further configured to conduct signal subtraction to different rows of each image sensitive unit row on the image sensors, which is carried out in any one of the following manners:
conducting signal progressive subtraction to each row of image sensitive units, and outputting progressive subtraction result;
conducting signal interlaced subtraction to each row of image sensitive units, and outputting interlaced subtraction result; and
adding m adjacent rows of signals and taking an average thereof, with every m rows of image sensitive units viewed as a region, conducting subtraction region-by-region, and outputting subtraction result region-by-region.

7. The detection system for a moving target based on multiple sensors on the same platform in accordance with claim 6, further comprising a velocity of movement operation device connected with the moving target recognition device, the velocity of movement operation device being configured to compute velocity of movement of a recognized moving target.

\* \* \* \* \*